3,720,061
CLAMPING UNIT FOR THE CASTING MOLD OF
AN INJECTION MOLDING MACHINE
Karl Hehl, Siedlung 183, Lossburg, Wurtt., Germany
Filed Oct. 18, 1971, Ser. No. 189,977
Claims priority, application Germany, Oct. 17, 1970,
P 20 51 083.2; Jan. 28, 1971, P 21 03 926.9
Int. Cl. F15b 15/18
U.S. Cl. 60—468                     17 Claims

ABSTRACT OF THE DISCLOSURE

A clamping unit for the mold halves of an injection molding machine including a mold carrier for one of the mold halves and hydraulic drive means including pressure cylinders, hydraulic drive cylinders and a pump system. The pressure cylinders include a piston therein from which the pistons of the hydraulic drive cylinders extend. The pistons divide the pressure cylinders into two chambers with the surface area of the piston being different in each chamber. The pressure cylinders include a connecting channel for connecting the two chambers, with the connecting channel including a shut-off valve for effecting control between the two chambers. The pressure cylinders further include a frontal face on which the other of the mold halves is supported. The pressure cylinders and drive cylinders are each directly fed by the pump system which delivers a pressure medium in either one of two ranges for effecting control of the clamping unit.

BACKGROUND OF THE INVENTION

The present invention relates to injection molding machines, and more particularly to a clamping unit for the casting mold of an injection molding machine for plastics in which a movable carrier for one of the mold halves is connected by piston rods with the pressure pistons of the pressure cylinders of a hydraulic drive means and the other mold half is supported at the frontal side of the pressure cylinders, and in which hydraulic drive cylinders are fastened coaxially to the pressure cylinders.

The pistons of the hydraulic drive cylinders preferably form a moving unit with the pressure pistons of the pressure cylinders. The pressure cylinders are divided into two chambers disposed respectively in front of and behind the pressure piston. These chambers are preferably connected together by a connecting channel in which a shutoff valve is disposed. The shutoff valve is controlled to be in a closed position during a pressure period and in an open position during the opening and closing stroke for the mold.

"Pressure period" as used hereinabove, refers to that period in which the plastic to be molded is injected into the mold, with the mold being forcibly held closed during this period.

In a known clamping unit of this type, the opening and closing strokes are performed with the aid of the drive cylinders. This type clamping unit is distinguished by a simple structural design since the movable carrier for the one mold half is directly seated on the piston rods of the pressure cylinders and the drive cylinders are formed into a structural unit with the pressure cylinders. This clamping unit is further characterized in that the opening and closing movement of the mold can take place very rapidly and with a minimum use of pressure medium (oil, for example) because the pressure medium remains substantially in internal circulation within the hydraulic circuit including the pressure cylinders without requiring delivery to a tank chamber or reservoir.

A clamping unit which is of a comparable type is disclosed in U.S. Pat. No. 3,327,474. The clamping unit is provided with a high pressure source from which the pressure cylinders are fed with a high pressure medium also during the opening and closing stroke.

SUMMARY OF THE INVENTION

It is an object of the present invention to provide an improved clamping unit of the type referred to above which will withstand high stresses, particularly continuous stresses, without adversely affecting its advantageous features.

It is another object of the present invention to provide a clamping unit in which the pistons for both the pressure cylinders and the hydraulic drive cylinders form a movable unit.

It is still another object of the present invention to provide a clamping unit in which the pressure cylinders are divided by the pressure pistons into two chambers which are connected by a connecting channel within which a shutoff valve is disposed.

It is yet another object of the present invention to provide a clamping unit with a hydraulic circuit including an auxiliary valve for effecting two modes of operation for opening the mold.

These and other objects are accomplished according to the present invention by the combination of a clamping unit in which the pressure cylinders and drive cylinders thereof are coaxially connected with the pistons of the drive cylinders formed as integral extensions of the piston rods of the pressure cylinders, and in which a hydraulic drive unit is provided for effecting the opening and closing strokes as well as a pressure period for the clamping unit. The diameter of the drive cylinder pistons is larger than the diameter of the pressure cylinder piston rods and together they form an annular shoulder against which the pistons of the pressure cylinders abut.

The dydraulic drive unit includes a pump system and hydraulic lines which connect the pump system to the pressure and drive cylinders. The pump system alternatingly provides at least two different pressure ranges, i.e. a low pressure range, and a high pressure range of a pressure medium which is delivered to the pressure and drive cylinders, and is so designed that during the pressure period, when the drive cylinders are substantially non-pressurized, the pressure pistons are charged with a pressure in the high pressure range, and that during the closing stroke the pressure pistons are charged with a pressure in the low pressure range.

The pistons of the pressure cylinders are provided with annular seals which are deformed or biased only in the high pressure range by axial compression due to the pressure exerted by the pressure medium. As a result the seals form a perfectly tight planar contact with the inner wall of the pressure cylinders. During operation in the low pressure range, the seals contact, or almost contact, the inner wall of the pressure cylinders on an approximately circular line without there being any significant deformation of the seals.

With such a configuration of the clamping unit there results a number of substantial advantages. For example, the structural simplification of the drive cylinders reduces the costs of the fabrication of the clamping unit but results in the requirement that the closing stroke must be performed by the pressure cylinders. Nevertheless, all phases of movement, the opening stroke and closing stroke, for example, take place with the actuating medium in the pressure cylinders exerting a substantially low pressure, i.e. the pressure level is of such a value that only insignificant deformation and frictional stresses occur on the annular seal provided for the pressure pistons. A deformation of the annular seal of the pressure piston occurs only when the closing pressure for the casting mold is being built up. This extends the wear life of the seals considerably.

To achieve this advantage, i.e. the charging of the pressure cylinder during the opening and closing stroke with a pressure in the low pressure range a necessary prerequisite is the use of a very simple and economical safety device which also dependably prevents damage to the machine, particularly to the mold, by foreign bodies and aids in preventing injuries to the operating personnel during the closing stroke of the clamping unit. This safety device takes the form of a simple limit pressure valve or safety valve. The safety valve is inserted in the line which short-circuits a connecting channel which is situated between the front and rearward cylinder chambers of the pressure cylinders with a tank chamber or reservoir. The adjusted limit pressure of the safety valve lies slightly above the value of the low pressure of the pressure medium which exists in the pressure cylinder during the closing stroke of the clamping unit. With this safety valve it is thus possible to assure that the pressure medium flowing into the pressure cylinders during the closing stroke will rapidly be diverted and flow through the safety valve into the tank chamber or reservoir as soon as the movable carrier for the one mold half encounters resistance due, for example, to the presence of a foreign body or a part of the operator's body during the closing stroke. The use of such a safety valve is thus possible only if a low pressure is present in the pressure cylinders during the closing stroke, e.g. about 6 atmosphere gauge. This, of course, is not possible, for example, for a clamping unit which operates exclusively with a single high pressure source. This achievement becomes even more significant when it is realized that, for effective protection of both machine and operating personnel during the closing stroke phase of machine operation, relatively expensive and technically complicated structures have been thus far required.

Finally, another advantage inherent in a clamping unit of the type in question results from the fact that only small amounts of oil are exchanged between the drive cylinders and the tank chamber or reservoir, which in turn results in a high operating speed. This is so because during the closing stroke of the clamping unit the pressure medium also flows substantially in an internal cycle from the front cylinder chamber to the rear cylinder chamber and vice versa.

Advisably an auxiliary valve is connected to a main switching valve for a selective acceleration of the opening stroke of the clamping unit. The auxiliary valve can be selectively put in operation or activated during an operative mode II or taken out of operation, that is, rendered passive during an operative mode I of the clamping unit. At the beginning of the opening stroke, all cylinder chambers of the pressure cylinders and the drive cylinders can be charged with a pressure medium in the low pressure range to effect this opening stroke.

DESCRIPTION OF THE PREFERRED EMBODIMENTS

Figure 1:
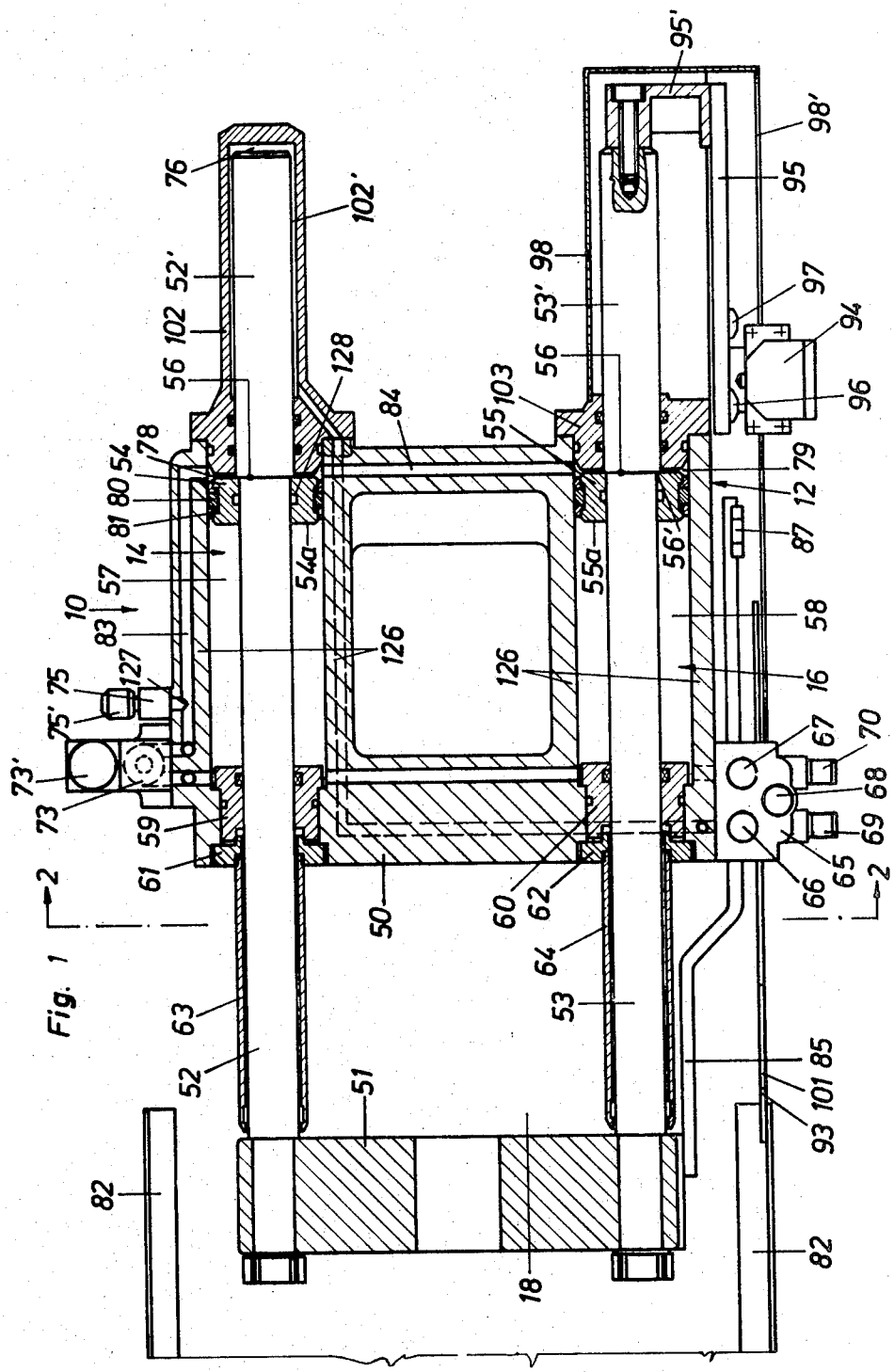
FIG. 1 is a cross-sectional plan view of the clamping unit of the present invention.
Figure 2:
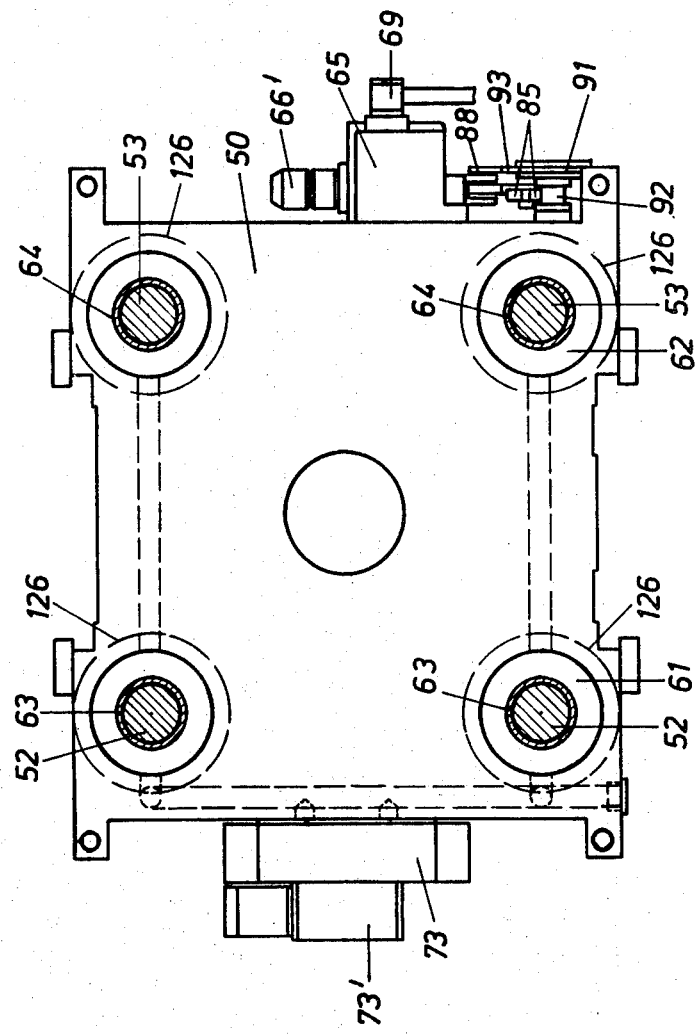
FIG. 2 is a partially cross-sectional frontal view of the clamping unit taken along line 2—2 of FIG. 1.

Turning now to a more specific consideration of the present invention as illustrated in FIGS. 1–6, a movable carrier 51 for one mold half of an injection mold is connected via piston rods 52, 53 with pressure pistons 54, 55. The pressure pistons 54, 55 are mounted within pressure cylinders 126 of a hydraulic drive unit 10 of the clamping unit. The pressure cylinders 126 are formed by corresponding bores 14, 16 in a block-shaped, stationary carrier 12 for the other mold half. The carrier 12 has a frontal side 50, which is preferably rectangular (FIG. 2), against which the other mold half is clamped or supported in a conventional manner. The bores 14, 16 forming the pressure cylinders 126 are closed at one end thereof by guide bearings 59, 60, and by cylinder covers 61, 62. Protective sleeves 63, 64 are anchored within the cylinder covers 61, 62. These protective sleeves enclose the piston rods 52, 53 in the mold area 18 and shield the sensitive outer surface of the piston rods. At the other end, the bores 14, 16 are closed by cylinder covers 103 or by the flanged coaxial drive cylinders 102. The carrier 12 has preferably four pressure cylinders 126 formed therein. The pressure cylinders are preferably located one each at the four corners of the rectangularly configured carrier. Because of the symmetrical design specific reference is made hereinbelow to two of the pressure cylinders only.

The drive cylinders 102 are supported with their flanges to two diagonally disposed pressure cylinders 126. The drive cylinders 102 receive within gores 102' formed therein the piston rod extensions 52', 53'. These piston rod extension have a greater diameter than the piston rods 52, 53 and serve as pistons for the two diagonal drive cylinders 102. The piston rod extensions form, along with the drive cylinders 102, chamber 76, 77. At the junction of the piston rods 52, 53 and the piston rod extensions 52', 53' an annular shoulder 56 is formed. The annular shoulder 56 provides an abutment surface 56' against which the pressure pistons 54, 55 are mounted on the piston rods 52, 53. Such a configuration facilitates fabrication of the piston and piston rod assembly because the piston and the piston rod need not be turned from a single piece. On the other hand, in spite of the fact that the piston is a separately fabricated item, no fastening or connecting means are employed in supporting the piston on the piston rod. This is desirable since to otherwise anchor the piston to the piston rod would generally require connecting means which engage in the surface of the piston rod. As a result, the cross-sectional area of the piston rod would be reduced. Reducing the cross-sectional area of the piston rod reduces the mechanical stability and stress capacity of the piston rod. Consequently, in order to maintain the desired degree of stability and structural integrity while utilizing connecting means, it becomes necessary to increase the diameter of the piston rods. According to the present invention, however, connecting means are not needed so that the diameter of the piston rods can be kept as small as possible resulting in a substantial savings in weight.

One of the other remaining two pressure cylinders 126 which does not have a drive cylinder 102 associated therewith has fastened instead to the piston rod extension 53' the aforementioned cylinder cover 103. This piston rod extension is enclosed by a housing 98. Within the housing 98 there is mounted a switching rod 95 which extends parallel to the rod extension 53. The rod 95 is mounted by a mounting assembly 95' to the rod extension 53'. The switching rod 95 has mounted along its parallel extent two switching cams 96, 97. The switching cams cooperate with the switching members of a microswitch which in turn is accommodated in a stationary switching column 94 mounted on one side 98' of the cover 98. As a result of the cam and microswitch cooperation, the extent of the opening stroke of the clamping unit can be controlled within selected limits. Moreover, the hydraulic system of the present invention can be effectively shifted from a closing stroke of the clamping unit to a pressure period, that is, a pressure phase change can be effected from a low pressure phase to a maximum pressure phase. A more detailed consideration of these pressure phases is set forth hereinafter.

The remaining piston rod extension 53' is covered by a cylindrical cover (not shown).

Figure 4:
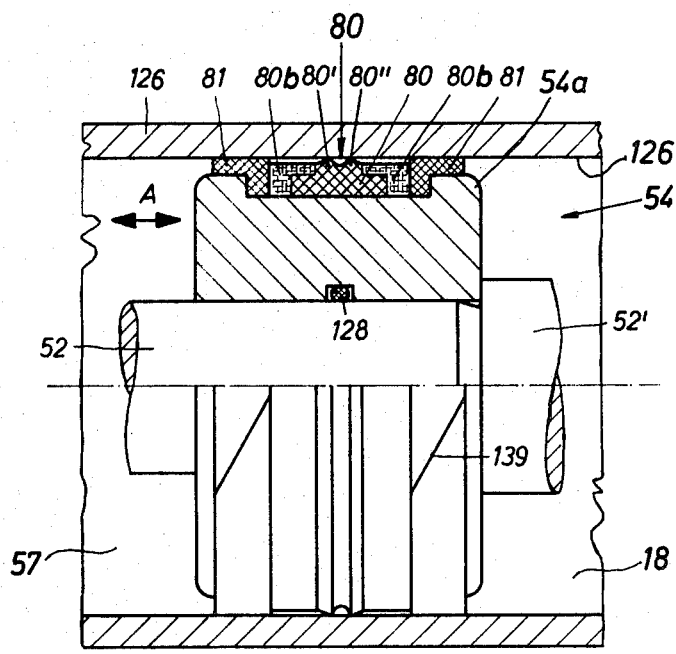
FIG. 4 is a detailed partly cross-sectional view of the pressure piston illustrating the annular seal in a non-deformed state during the operating or closing stroke of the clamping unit of the present invention.
Figure 5:
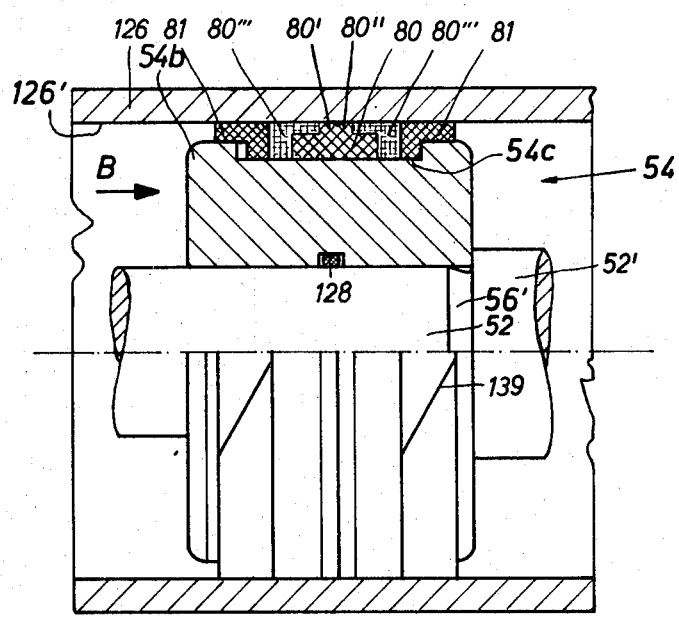
FIG. 5 is a view similar to FIG. 4 illustrating the annular seal in a deformed or prestressed condition during the pressure period for the clamping unit of the present invention.

The pressure pistons 54, 55 are formed from a cylindrical body 54a, as best seen in FIGS. 1, 4 and 5. The body 54a is mounted on the piston rod 52 or 53 in any conventional manner. The outer diameter of the body 54a is displaced as a result of the mounting so that the outer surface 54b is spaced from the inner cylinder wall 126' of the pressure cylinder 126. A preferably symmetrically disposed peripheral groove 54c is formed in the wall of the cylindrical body 54a. This groove receives therein an annular sealing assembly 80. The sealing assembly 80 includes an annular seal 80a which is flanked by woven inserts 80b and a plastic mounting ring 81. The ring 81 serves to axially fix the seal 80a within the groove 54c. The seal 80a is provided preferably with a pair of spaced sealing lips 80', 80''. These lips contact the inner cylinder walls 126' of the pressure cylinders 126 and form an approximate point contact in which no appreciable pressure is exerted by the lips 80', 80'' against the walls 126'. To facilitate installation, each of the rings 81 is provided with a generally transverse slit 139.

The bores 14, 16 form, along with the piston rods 52, 53, the cylindrical bodies 54a, 55a and the sealing assemblies 80, the front cylinder chambers 57, 58; while the bores 14, 16 form, along with the pistons 52', 53', the cylindrical bodies 54a, 55a, and the sealing assemblies 80, the rear cylinder chambers 78, 79.

A connecting channel 83 connects the front cylinder chamber 57 or 58 with the rear cylinder chamber 78 or 79 of the pressure cylinder 126. A shutoff valve 73 having a control body 73' is inserted in the connecting channel 83. The connecting channel is also in communication with a tank chamber 125 via a safety valve 75. The safety valve 75 opens when a limit pressure, which has been set by means of a rotatable knob 75' has been reached and thus short-circuits the connecting channel 83 with the tank chamber 125. The purpose for short-circuiting the connecting channel 83 with the tank chamber 125 will be discussed more fully hereinafter.

Figure 3:
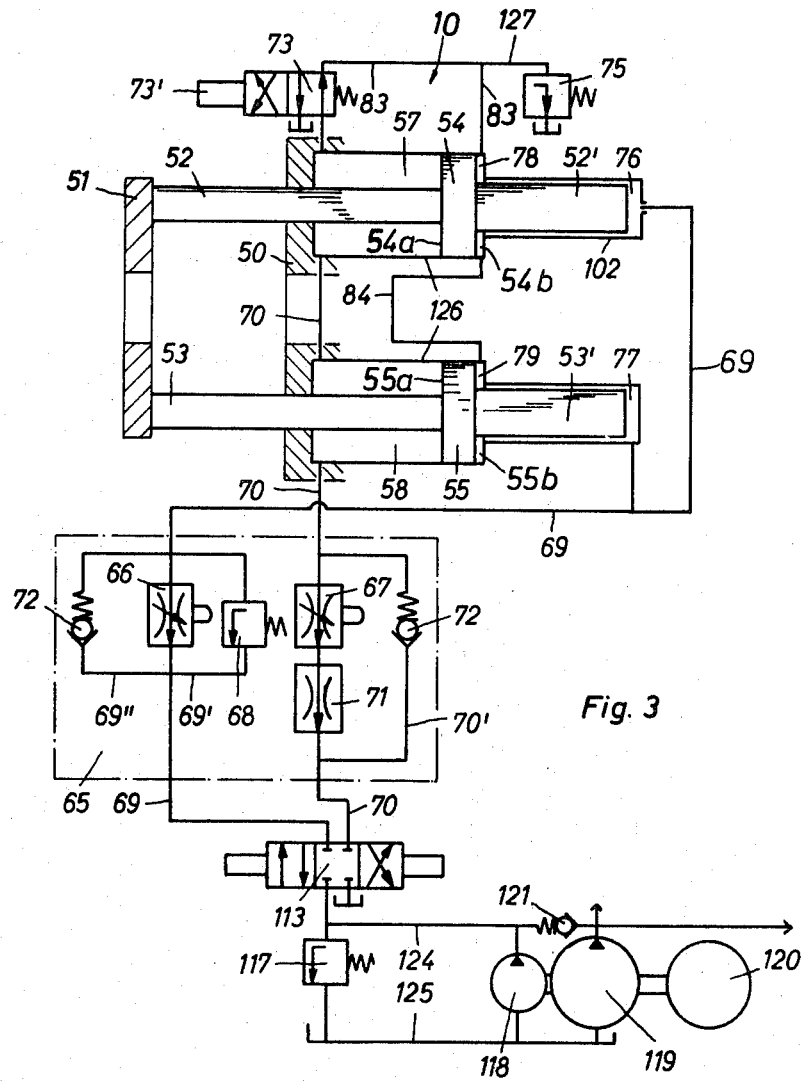
FIG. 3 is a partly schematic partly cross-sectional representation of one embodiment of a hydraulic control circuit for the clamping unit of the present invention.

Referring to FIG. 3, the drive cylinder 102 and pressure cylinder 126 of the hydraulic drive unit 10 are fed directly by pumps 118, 119. The pumps 118, 119 are driven by an electric motor 120. The pump 118 is one which produces a low output at relatively high pressure, while the pump 119 is a control pump with a very high output whose pressure adjusts itself automatically with respect to the output, that is, a high output requiring a low pressure and a low output requiring a high pressure. A safety valve 117 is connected between a main line 124 of the pumps 118, 119 and a tank chamber 125. The main line 124 leads to a main switching valve 113 for the clamping unit. From there a line including an adjustable control valve 67 and a fixed choke 71 (constriction in the line) leads to the front cylinder chambers 57, 58 of the pressure cylinders 126. In a side or by-pass branch 70' of the line 70 there is disposed a check valve 72. A line 69 leading from the main switching valve 113 to the drive cylinders 102 is also provided with an adjustable control valve 66. In a side or by-pass branch 69' of line 69 a safety valve 68 is included and in a further side branch 69'' a check valve 72 is included. The control valves 66 and 67 permit setting of the flow-through cross section in the lines 69, 70, respectively, and thus a control of the speed of the opening or closing stroke, respectively, of the clamping unit.

The path-dependent control of the control valves 66, 67, to attenuate the opening and closing stroke is effected, as can be seen in FIG. 1, with the aid of an elongated switching rod 85 which is fastened at the movable mold carrier 51. The switching rod 85 is provided along its length with actuating cams 87 (only one being shown). These cams effect a direct mechanical control of the valve bodies of the control valves 66, 67.

The check valves 72 in the side branches 69'' and 70' assure that during the opening and closing strokes, the pressure medium displaced from the pressure cylinders 126 or the drive cylinders 102, respectively, can reach the tank chamber 125 only through control valve 67 and the choke 71 or the valve 66, respectively.

A switching rod 93 is fastened to a protecting pusher 82 for the clamping unit, which covers the mold area 18 and the area of the movable carrier 51 while operating for prevention of accidents.

The rod 93 has a cam 101 which also cooperates with the control valves 66, 67, and serves as a safety device. If the movable protective slide 82 is removed from the critical area of the mold, the cam 101 engages the valve body of the control valve 66 and transfers it to its seat so that the hydraulic cycle is blocked.

The hydraulic drive unit 10 of the clamping unit operates as follows:

For the opening stroke, the pressure medium is conveyed by the two pumps 118, 119 via the main line 124, the main switching valve 113, line 69, branch line 69'' and check valve 72 into the cylinder chambers 76, 77 of the drive cylinders 102. With the shutoff valve 73 open, the pressure medium within the chambers 57, 58 which are connected together by a portion of line 70, may escape through the valve 73 and line 83 into the cylinder chambers 78, 79, the latter chambers being connected together by a line 84. Thus there results a movement toward the left of the unit including elements 51; 52; 53; 55; 52'; and 53'. Since the rearward cylinder chambers 78, 79 have a smaller volume than the frontal cylinder chambers 57, 58 due to the larger cross section of piston rods 52', 53', a certain excess of pressure medium is removed via control valve 67, choke 71 and line 70 into the tank chamber during the opening stroke. Thus the speed of the opening stroke depends on the setting of control valve 67, i.e., on its flow-through cross section. If the flow-through cross section of the control valve 67 is greater than the flow-through cross section of the fixed choke 71, i.e., when the control valve is substantially open, the choke insures that the pressure medium escaping from the cylinder chambers 57, 58, preferably flows through the connecting channel 83, which has a larger cross section than the choke 71, and into cylinder chambers 78, 79.

In the last phase of the opening stroke the control valve 67 is further choked off by cam 87 of the control rod 85 so that an attenuation of the movement results. That is, the flow-through cross section is reduced from its set value. The pressure of the pressure medium during the opening stroke is about 5 to 7 atmosphere gauge pressure (low pressure range). This results because the control pump 119 must put out a relatively high output and the corresponding pressure value is thus relatively low.

During the closing stroke the pressure medium, which is also at about a pressure of approximately 5 to 7 atmosphere gauge, passes through the main switching valve 113, line 70, branch 70' and check valve 72 into cylinder chambers 57, 58 of the pressure cylinders 126. With the shutoff valve 73 in the connecting channel 83 open, the rearward cylinder chambers 78, 79 will thus be under a pressure which corresponds to the pressure in cylinder chambers 57, 58. Because of the volume differences already referred to, that is, because of the difference in area between the front surfaces 54a, 55a and rear surfaces 54b, 55b of the pressure piston 54 and 55, respectively, there results a force differential which gives rise to a movement toward the right of the unit including elements 51; 52; 53; 54; 55; 52'; and 53'. With this movement the pressure medium is removed from the cylinder chambers 78, 79, and is delivered, via the connecting channel 83, to the cylinder chambers 57, 58. At the same time the pressure medium disposed in the cylinder chambers 76, 77 of the drive cylinders 102 is delivered through line 69 and the control valve 66 into the oil tank 125. The speed of the closing stroke depends on the setting of the control valve 66 which also effects the final attenuation of the closing stroke. The attenuation is effected by an appropriate cam (not shown in FIG. 1) of the switching rod 85 which engages the valve body of the valve 66 and causes it to function as a choke.

At the end of the closing stroke, one of the switching cams of the switching rod 95 contacts the switching member of the microswitch on the switching column 94 to thereby initiate the pressure period phase of clamping unit operation. A high pressure is developed by closing the shutoff valve 73 and operating both pumps 118, 119 at maximum pressure. The maximum pressure measured in the lines 70, 70' lies in the vicinity of about 160 to 200 atmosphere gauge.

As soon as the closing pressure has been developed, the output of the control pump 119 can be used for other purposes, e.g., for injecting the material into the mold. If such an additional use for the pump 119 does not exist, then the entire clamping unit can be supplied by only a single control pump.

If during the closing stroke a foreign body is disposed between the mold halves so that a resistance is placed against the movement of the movable mold half before the closing stroke is completed, the conveyed pressure medium which develops in the cylinder chambers 57, 58 will escape through the line 127 and the safety valve 75 and into the tank chamber 125. The valve 75 has a pressure limit which preferably lies somewhat above the pressure in the cylinder chambers 57, 58. For example, if the pressure of the pressure medium is designed to reach 6 atmosphere gauge during the closing stroke, the safety valve 75 can be set, for example, to a pressure limit of 6.5 or 7 atmosphere gauge. If then a foreign body is disposed between the mold halves or if the operator happens to bring a part of his body between the closing mold halves, the pressure medium is immediately diverted and conducted through the short-circuit line 127 into the tank chamber 125.

FIGS. 4 and 5 show the different behavior or the different state, respectively, of the annular seal 80 of the pressure piston 54 during a low pressure application on the one hand (FIG. 4), and during the high pressure application on the other hand (FIG. 5). During the low pressure application, the annular sealing lips 80', 80'' of the annular seal 80 contact the inner wall 126' of the associated pressure cylinder 126 with only a light contact pressure, without deformation and uniformly along a circular line. In this state pistons 54 and 55, respectively, are moved in both directions during the opening and closing stroke as shown by the double arrow A of FIG. 4. The resulting seal is entirely sufficient for the available low pressure of approximately 6 atmosphere gauge to assure proper operation even if only a minimal amount of oil (pressure medium) passes through the seal. During a high pressure application, however, i.e., during the pressure period, one of the two synthetic mounting rings 81 is axially displaced in the direction indicated by the arrow B by the high pressure medium. The annular seal 80 with its woven inserts 80''' are axially compressed as a result of the displacement of the ring 81. The seal 80 is also radially displaced against the wall 126' and establishes thereby a large radial contact area of the two sealing lips 80', 80'' with the wall 126'. In spite of the large contact area, wear on the seal is substantially eliminated because during the deformed state of the annular seal no axial movement of the pressure piston takes place.

Moreover, in the configuration of the clamping unit according to the present invention the oil exchange between the hydraulic drive means and the tank chamber is significantly less than for the prior art systems. For example, in the hydraulic drive means disclosed in the U.S. Patent No. 3,327,474 referred to above, the oil exchange under consideration is rather large, while for the clamping unit disclosed in the Italian Patent No. 839,916 and specifically the embodiment of FIG. 1, the oil exchange between the cylinder chambers on the one hand and the tank chamber on the other hand is still substantially greater than in the arrangement according to the present invention. This is so because substantially no oil reaches the tank chamber during the closing stroke of the clamping unit.

The reason for this result is that the closing stroke is now effected with the aid of the pressure cylinders 126, and specifically because of the difference between the charged surfaces 54a, 54b and 55a, 55b on the front and rear side respectively of the pressure piston 54 and the fact that the drive cylinders 102 have only a single small cylinder chamber due to the specific design of the pistons 52, 53, which include the piston rod extensions 52', 53'.

A minimum of oil exchange or oil consumption, respectively, is a decisive advantage because it is the prerequisite for the opening and closing strokes of the clamping unit at maximum speed.

Figure 6:
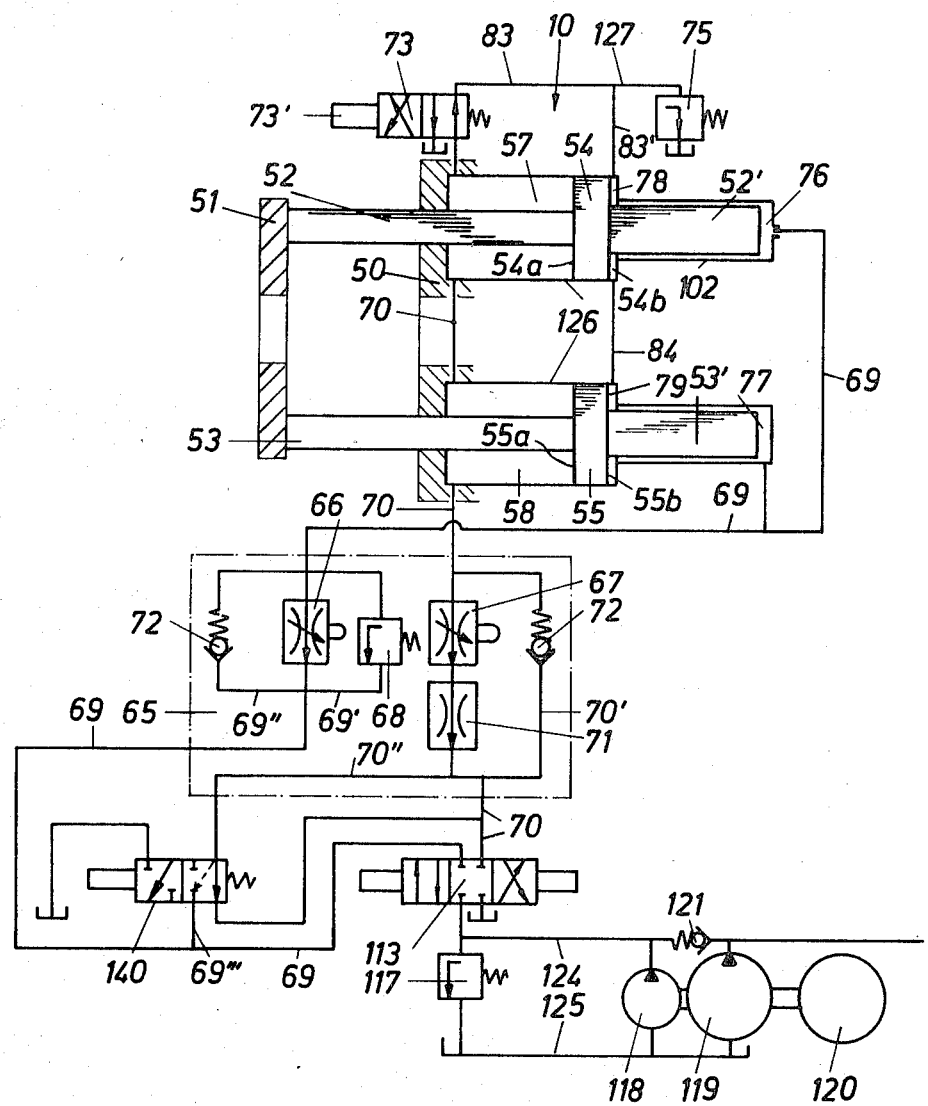
FIG. 6 is a view similar to that of FIG. 3 and illustrating another embodiment of the hydraulic control circuit including an auxiliary valve, for the clamping unit of the present invention.

In the embodiment according to FIG. 6, the opening stroke can be substantially accelerated in that the main switching valve 113 can be connected to an auxiliary switching valve 140 by the hydraulic lines 69, 70, which in turn lead to and from the cylinder chambers 57, 58 and 76, 77, respectively. The auxiliary valve 140 can be selectively put into operation (activation or mode of operation II), or taken out of operation (passivation or mode of operation I). With the aid of the auxiliary valve 140, all of the cylinder chambers 57, 58 and 76, 77 of the pressure cylinders 126 and the drive cylinders 102, respectively, can be charged with a pressure medium at the beginning of the opening stroke when the valve 140 is activated. When the valve 140 is not activated during the opening stroke, only the pistons 52', 53' of the drive cylinders 102 are charged.

The main line 70 leading from the main switching valve 113 to the cylinder chambers 57, 58 of the pressure cylinders 126, and the main line 69 leading from the main switching valve 113 to the cylinder chambers 76, 77 of the drive cylinders 102 are thus provided with a branch line 70'' and a branch line 69''', respectively, which serve to connect the valve 140 to the main switching valve 113. The auxiliary valve can be selectively actuated by means of a selector switch (not shown) and included in the circuit of the clamping unit including the main switching valve (activation), or the auxiliary valve can be removed from this circuit (passivation). In the latter case the auxiliary valve is entirely passive, i.e. it has no influence whatsoever on the hydraulic control of the clamping unit.

During passivation of the auxiliary valve 140, the mode of operation of the clamping unit corresponds exactly to the mode of operation described above with respect to FIG. 3 which has been referred to as mode of operation I. During the mode of operation I, the lines 69 and 70 are not hydraulically connected to the auxiliary valve 140. Upon activation of the auxiliary valve, i.e. when it is included in the circuit of the main switching valve through actuation, for example, by an operator, of the selector switch, the main and auxiliary valves are controlled in synchronism. The auxiliary valve is actuated by the same electrical pulses which cause the main valve to effect a "closing stroke" or an "opening stroke." The auxiliary valve assumes the position shown in FIG. 6 during the "closing stroke" pulse. This position corresponds to a by-pass position. During the "opening stroke" pulse, the auxiliary valve 140 assumes a position (operating position) which is opposite to the position shown in FIG. 6. During each operating cycle of the clamping unit, which consists of a closing stroke, a pressure period and an opening stroke, the auxiliary valve is switched once from the by-pass position to the operating position. During the closing stroke and during the pressure period it is in the by-pass position. When it is in the operating position, i.e. in a position indicated by the dotted arrow in FIG. 6, the pressure medium not only passes through the main line 69 into the cylinder chambers 76, 77 of the drive cylinders 102 but it is also fed into line 70" in the auxiliary valve 140 so that now cylinder chambers 57, 58 and also cylinder chambers 78, 79, via line 83, are charged.

The activation of the auxiliary valve 140 commences an additional mode of operation (mode of operation II) for the clamping unit, which differs from the mode of operation I without the auxiliary valve by a different hydraulic control of the opening stroke of the clamping unit. During the opening stroke in operating mode II, both main lines 70 and 69 are charged with a pressure medium which is in the low pressure range. All areas of the pressure pistons 54, 55 and the pistons 52', 53' of the drive cylinders 102 are charged, and all cylinder chambers 57, 58; 76, 77; and 78, 79 are short-circuited. The opening stroke thus results from an effective piston surface which corresponds to the difference in cross section between the piston rods 52 and 53, and the piston rods 52' and 53', respectively. This effective piston surface is substantially smaller than that piston surface which is charged during the opening stroke in operative mode I because in the latter mode, the piston surface of the pistons 76, 77 of the drive cylinders 102 are charged only and exclusively during the opening stroke, the pressure cylinder 126 being for all practical purposes nonpressurized. As a result the opening stroke during operative mode II takes place, under the prerequisite of an identical oil output from pumps 118, 119, at a substantially faster rate, and with a lower developed force than in operative mode I.

In both operative modes, the pressure pistons 54 and 55 are moved from right to left (FIGS. 3 and 6) during the opening stroke. Since the cross section of the piston rods 52', 53' forming the pistons of the drive cylinder 102 is greater than the cross section of the piston rods 52, 53, the volume of the cylinder chambers 57, 58 is greater than the volume of the rearward cylinder chambers 78, 79. Consequently, the volume of the oil displaced from the cylinder chambers 57, 58 cannot be entirely accommodated within the volume of the rearward cylinder chambers 78, 79. The excess quantity of oil (residual oil quantity) is delivered through the control valve 67, which controls the speed and the final attenuation of the opening stroke. From the control valve 67, the excess oil passes through the choke 71, the branch line 70" and the auxiliary valve 140 into the line 69 and thus into the cylinder chambers 76, 77 of the drive cylinders 102. This means that, contrary to the operative mode I in which the residual quantity of oil is delivered to the tank chamber 125, the residual quantity of oil is fed to the drive cylinders 102. This diversion of the residual oil contributes to a desirable acceleration of the opening stroke in that the quantity of oil available for driving the drive cylinders 102 is increased by the residual oil quantity. With this transfer of the residual oil quantity into the drive cylinders 102 during the operative mode II, the amount of oil which reaches the tank chamber 125 of the clamping unit with each operating cycle is further reduced in comparison to the operative mode I. In the operative mode II more oil remains in internal circulation within cylinder chambers 57, 58; 78, 79; and 76, 77 of the pressure and drive cylinders 126 and 102, respectively. This additional oil circulation substantially increases the operating speed of the opening stroke. For example, practical experience has shown that a frequency of twenty-five operating cycles per minute during a mode I operation was increased to a frequency of thirty operating cycles per minute during a mode II operation because of the acceleration of the opening stroke due to the residual oil quantity control.

When the residual oil quantity is fed into the drive cylinders 102 during the opening stroke of the operative mode II, the control valve 66 is ineffective. As in the operative mode I, the valve 66 only serves to control the speed and attenuation of the closing stroke. In the operative mode II the residual oil quantity fed into the drive cylinders 102 during the opening stroke passes through control valve 67 so that, as in the operative mode I, the possibility exists of controlling the speed and attenuating the final phase of the opening stroke with the aid of the control valve 67.

The user of the clamping unit may, of course, select between modes of operation I and II. Generally, the operative mode II will be preferred because of the faster opening stroke and the somewhat reduced force associated therewith. In special cases, however, and particularly when the opening of the mold requires somewhat more force and is not so concerned with the speed of the opening stroke, the operative mode I will be preferred. For example, consider the production of a cup-shaped molded item whose walls extend directly into the opening direction of the mold. With such a mold the core of the molded item is inserted into the cavity of the cup-shaped item and connected with one mold half. This core is preferably clamped to a certain degree to the other mold half through the wall of the molded item because the molded item is not entirely cooled at the moment. For this reason substantial forces are often required to separate the two mold halves from one another. In such and similar cases it is advisable, therefore, to set the clamping unit to the operative mode I.

If the expected use of the clamping unit is such that a separating force such as is developed in the operative mode I is not required during the opening stroke, then this mode of operation may be eliminated entirely and the main switching valve 113 may be omitted. In its place the auxiliary valve 140 which is permanently included in the circuit of the clamping unit, acts now as the main switching valve. The exclusive mode of operation of such a clamping unit corresponds to the operative mode II.

The term "injection molding machine" is to be understood in the broadest sense and includes machines for processing thermoplastics, duroplastics, elastomers by injection molding or metals by die casting.

It will be understood that the above description of the present invention is susceptible to various modifications, changes and adaptations, and the same are intended to be comprehended within the meaning and range of equivalents of the appended claims.

I claim:

1. A clamping unit for the mold of an injection molding machine, the mold being composed of two mold halves and the unit comprising:

a movable carrier for one of the mold halves; and a hydraulic drive means comprising pressure cylinders, hydraulic drive cylinders and a pump system, said pressure cylinders each including a frontal face, a connecting channel, a pressure piston therein and a piston rod extending therefrom with said movable carrier being connected to said piston rods and the other mold half being supported at the frontal face of said pressure cylinders, said hydraulic drive cylinders being fastened coaxially to said pressure cylinders, with each hydraulic drive cylinder includuing a drive piston therein, said drive pistons forming a movable unit with said pressure pistons, each said pressure piston dividing its associated pressure cylinder into a front and a rear cylinder chamber disposed in front of and behind said pressure piston, respectively, said chambers being connected together by said connection channel, and said connecting channel containing a shutoff valve which is controlled to be in a closed position during a pressure period and in an open position during the opening and closing stroke for the mold, and wherein said pistons of said drive cylinders form an extension of the piston rods of said pressure cylinders with said drive cylinder pistons being of a larger diameter than said piston rods of said pressure cylinders;

said pressure cylinders and said drive cylinders are fed directly by said pump system which alternatively provides at least a low pressure range and a high pressure range;

each of said pressure pistons is provided with an annular seal, each of said annular seals being compressed, to form a tight seal against the inner wall of said pressure cylinder, by a pressure operating in only the high pressure range, while contacting without significant deformation the inner wall of said pressure cylinder when said seals are subjected to a pressure in the low pressure range; and said hydraulic drive means further comprise means for delivering to said pressure pistons during said pressure period a pressure medium which exhibits a pressure in the high pressure range, and for delivering to said pressure pistons during said closing stroke a pressure medium which exhibits a pressure in the low pressure range, with the pressure in the low pressure range being sufficiently low to not significantly compress said annular seals.

2. The clamping unit as defined in claim 1, wherein said pressure pistons have a greater surface area in one said chamber than in the other said chamber of said pressure cylinders, and wherein said closing stroke is effected by said difference in conjunction with said pressure medium pressure in the low pressure range.

3. A clamping unit as defined in claim 1, wherein said hydraulic drive means further comprises a choke, a tank chamber and a hydraulic line which connects the front cylinder chamber of the pressure cylinder with said tank chamber, said choke being inserted in said line, and wherein the flow-through cross section of said choke is less than the minimum flow-through cross section of said connecting channel between the front and rear cylinder chambers.

4. A clamping unit as defined in claim 1, wherein said pump system includes a control pump which automatically furnishes a correspondingly low pressure and high output, and a correspondingly high pressure and low output.

5. A clamping unit as defined in claim 3, wherein the low pressure high output defines the low pressure range and the high pressure low output defines the high pressure range, and wherein the low pressure range preferably lies between 4 and 10 atmosphere gauge and the high pressure range preferably lies between 100 and 250 atmosphere gauge.

6. A clamping unit as defined in claim 3, wherein said hydraulic drive means further comprises a safety valve which opens at a predetermined limit pressure, said limit pressure lying above the low pressure range which the pressure medium exhibits in the pressure cylinder during said closing stroke of said clamping unit, said valve being connected to short-circuit said connecting channel with said tank chamber when said predetermined pressure is developed.

7. A clamping unit as defined in claim 1, wherein said pistons of said pressure cylinders and said drive cylinders form an annular shoulder, and wherein said pressure pistons include a cylindrical body mounted on said piston rod of said pressure cylinder to abut against said shoulder, said cylindrical body having an annular recess formed about its periphery for receiving therein said annular seal, said body being mounted on said piston rod without connecting or fastening elements.

8. A clamping unit as defined in claim 7, wherein said pressure pistons further include mounting rings disposed within said recess and on either side of said annular seal, and wherein said seal is deformable by axial pressure resulting from the axial displacement of one of said mounting rings during said pressure period so that said seal radially expands and contacts the inner wall of said pressure cylinder.

9. A clamping unit as defined in claim 1, wherein said hydraulic drive means further includes means for attenuating the opening and closing strokes of said clamping unit said means comprising a switching rod fastened to said movable carrier and provided with a plurality of switching cams, and a plurality of control valves which are engaged by said cams to effect said attenuation, said control valves being connected in circuit with said delivery means, which deliver pressure medium for said opening and closing strokes of said clamping unit.

10. A clamping unit as defined in claim 1, wherein said hydraulic drive means further comprises manually adjustable control valves connected in circuit with said delivery means, which deliver pressure medium for said opening and closing stroke of said clamping unit, said control valves being provided for attenuating said opening and closing strokes.

11. A clamping unit as defined in claim 9, wherein said hydraulic drive means further comprises a protective slide, a switching rod connected with said protective slide, said switching rod having a cam positioned thereon for acting directly on the valve body of one of said control valves.

12. A clamping unit as defined in claim 1 wherein said hydraulic drive means further comprises a main switching valve and an auxiliary valve connected in circuit therewith, said valves each serving to initiate an operative mode for said drive means, and with said auxiliary valve initiating an operative mode wherein said pressure cylinders and said drive cylinders can be charged with a pressure medium in the low pressure range at the beginning of said opening stroke to effect said opening stroke.

13. A clamping unit as defined in claim 12, wherein during one of said operative modes, both valves are controllable in synchronism by the same electrical pulses.

14. A clamping unit as defined in claim 13, wherein the synchronous control of both valves is such that the electrical pulse which sets the main valve for an opening stroke of said clamping unit also places the activated auxiliary valve in an operating position in which the cylinder chambers of said pressure cylinders and said drive cylinders are supplied with pressure medium in the low pressure range and that the electrical pulse which sets the main valve for a closing stroke of said clamping unit also places the activated auxiliary valve into a position wherein it has no influence on the hydraulic control of said clamping unit.

15. A clamping unit as defined in claim 12, wherein said hydraulic drive means further includes a hydraulic line which connects the auxiliary valve with the cylinder chambers of said pressure cylinders and with the cylinder chambers of said drive cylinders.

16. A clamping unit as defined in claim 15, wherein the auxiliary valve during one of said operative modes hydraulically connects a branch line of said hydraulic line leading to said drive cylinders with the line leading to said pressure cylinders and during the other of said operative modes is hydraulically disconnected from said branch line.

17. A clamping unit as defined in claim 12, wherein the main switching valve is connected in circuit with said auxiliary valve such that the main valve can be replaced by the continuously activated auxiliary valve.

References Cited

UNITED STATES PATENTS

| 1,888,332 | 11/1932 | Summey | 60—52 HF |
| 2,615,302 | 10/1952 | Camerota | 60—52 HF |
| 3,327,474 | 6/1967 | Schiffer | 60—51 |

EDGAR W. GEOGHEGAN, Primary Examiner

U.S. Cl. X.R.

92—207